United States Patent [19]

Baker

[11] Patent Number: 4,504,276

[45] Date of Patent: Mar. 12, 1985

[54] EMULSIFYING AGENTS

[75] Inventor: Alan S. Baker, Slough, England

[73] Assignee: Imperial Chemical Industries PLC, London, England

[21] Appl. No.: 478,481

[22] Filed: Mar. 24, 1983

[51] Int. Cl.$^3$ .............................................. C10L 1/32
[52] U.S. Cl. ........................................ 44/51; 44/56; 252/356
[58] Field of Search ............. 44/51, 53, 56, 57, 72, 44/71; 252/357, 356

[56] References Cited

U.S. PATENT DOCUMENTS

| | | | |
|---|---|---|---|
| 3,346,494 | 10/1967 | Robbins et al. | 44/51 |
| 3,437,465 | 4/1969 | LeSuer | 44/51 |
| 3,527,581 | 9/1970 | Brownawell et al. | 44/51 |
| 4,347,061 | 8/1982 | Madsen et al. | 44/51 |

Primary Examiner—William R. Dixon, Jr.
Assistant Examiner—Margaret B. Medley
Attorney, Agent, or Firm—Cushman, Darby & Cushman

[57] ABSTRACT

Surfactant compositions suitable for the emulsification of methanol or ethanol in hydrocarbon liquids, especially diesel oil, consist of a blend of (i) from 10% to 90% by weight of block or graft copolymer in which one polymeric component is the residue of an oil-soluble complex monocarboxylic acid and another polymeric component is the residue of a water-soluble polyalkylene glycol or polyalkyleneoxy polyol and (ii) from 90% by 10% by weight of the salt of an aliphatic amino compound with a long-chain aliphatic carboxylic acid.

12 Claims, No Drawings

EMULSIFYING AGENTS

This invention relates to novel surfactant compositions which are useful in the production of emulsions of polar liquids in hydrocarbon liquids, in particular of emulsions of methanol and ethanol in hydrocarbon fuels such as diesel oil.

It has been widely proposed, as a way of extending the available reserves of fossil hydrocarbon fuels, to blend petrol or gasoline with minor proportions of ethanol or, to a lesser extent, methanol, these alcohols being in principle obtainable from renewable natural resources. It would likewise be desirable to blend methanol or ethanol with heavier hydrocarbon fuel fractions, such as diesel oil, gas oil and fuel oil, but, in contrast to the situation with petrol or gasoline where the dry alcohol blends are in most cases homogeneous and are therefore straightforward to prepare, problems are encountered in producing the blends with the heavier fractions. On the one hand, the limited miscibility of methanol or ethanol with these fractions means that surface-active additives are required in order to stabilise the blends as emulsions; on the other hand, the fact that both of these alcohols are soluble to some extent in the hydrocarbon liquids in question and vice versa, means that conventional surfactants are not very effective for this purpose.

According to published British Application No. 2 051 124A, an emulsion of 20% by weight of methanol, 79% by weight of diesel oil and 1% of emulsifier can be prepared when the emulsifier is a block or graft copolymer of the type having the general formula (A—COO)$_m$B, wherein m is an integer of at least 2, each polymer component A has a molecular weight of at least 500 and is the residue of an oil-soluble complex monocarboxylic acid, and where each polymer component B has a molecular weight of at least 500, and, if m is equal to 2, is the divalent residue of a water-soluble polyalkylene glycol and, if m is higher than 2, is a residue having the valency m of a water-soluble polyether polyol. The emulsion obtained has, however, only a limited stability.

According to published British Application No. 2 002 400A, blends of the above-mentioned block or graft copolymers with conventional surfactants, such as the condensate of nonylphenol with 4 molar proportions of ethylene oxide, are useful for the emulsification of water in hydrocarbon fuel oils and Example 7 of the said application illustrates the case where methanol is additionally present in the disperse phase of the emulsion in order to confer greater stability of the emulsion towards low temperatures. However, in this case the methanol/water mixture contained 75% by weight of water.

We have now found that emulsions of much improved stability of methanol or ethanol, particularly in the heavier hydrocarbon fuel fractions, can be made more readily with the aid of a blend of a block copolymer as above described with the salt of an aliphatic amino compound with a long-chain aliphatic carboxylic acid.

The present invention accordingly provides a surfactant composition suitable for the emulsification of methanol or ethanol in a hydrocarbon liquid, the composition being a blend of:

(i) from 10% to 90% by weight of a block or graft copolymer having the general formula (A—COO)$_m$—B, wherein m is an integer at least 2, wherein each polymeric component A has a molecular weight of at least 500 and is the residue of an oil-soluble complex monocarboxylic acid having the general structural formula

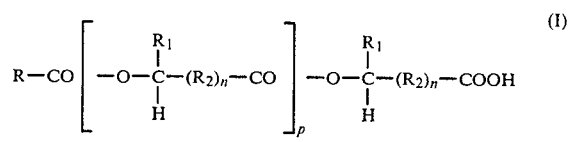

in which

R is hydrogen or a monovalent hydrocarbon or substituted hydrocarbon group;

R$_1$ is hydrogen or a monovalent C$_1$ to C$_{24}$ hydrocarbon group;

R$_2$ is a divalent C$_1$ to C$_{24}$ hydrocarbon group;

n is zero or 1;

p is an integer from zero up to 200;

and wherein each polymeric component B has a molecular weight of at least 500 and, in the case where m is 2, is the divalent residue of a water-soluble polyalkylene glycol having the general formula

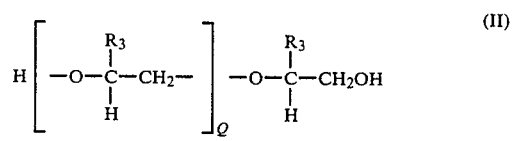

in which

R$_3$ is hydrogen or a C$_1$ to C$_3$ alkyl group;

q is an integer from 10 up to 500;

or in the case where m is greater than 2, is the residue of valency m of a water-soluble polyether polyol having the general formula

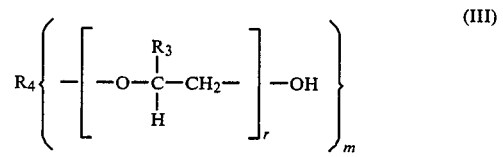

in which

R$_3$ and m have their previous significance;

R is zero or an integer from 1 to 500, provided that the total number of

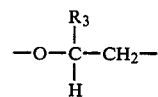

units in the molecule is at least 10;

R$_4$ is the residue of an organic compound containing in the molecule m hydrogen atoms reactive with an alkylene oxide;

with (ii) from 90% to 10% by weight of the salt of an aliphatic amino compound with a long-chain aliphatic carboxylic acid.

Block or graft copolymers as hereinabove defined are more fully described in the afore-mentioned British Application No. 2 002 400A and reference may be made thereto for details of their composition and the manner in which they may be prepared.

Preferred block or graft copolymers are those in which m in the above formula (I) has a value of 2 and the water-soluble polyalkylene glycol from which the polymeric component B is derived is a polyethylene glycol of molecular weight in the range 1000–4000. It is further preferred that the copolymer should contain from 20% to 50% by weight, especially from 30% to 45% by weight, of the polyethylene glycol-derived polymeric component B.

Aliphatic amino compounds which are suitable as one component of the salt constituents of the surfactant compositions include primary and secondary amines and diamines such as, for example, methylamine, n-butylamine, n-octylamine, dodecylamine, octadecylamine, morpholine and N,N-dimethylaminopropylamine, as well as alkylene oxide condensates from primary amines such as the condensate of 2 mols. of ethylene oxide with 1 mol. of a $C_{18}$ primary amine which is commercially available as "Ethomeen" 18/12 (Registered Trade Mark). Particularly suitable amino compounds are the aminoalcohols such as, for example, diethanolamine, triethanolamine, methyldiethanolamine and N,N-dimethylaminoethanol.

Long-chain aliphatic carboxylic acids which are suitable as the other component of the salt constituent of the surfactant compositions include, for example, the poly(isobutenyl)succinic acids of molecular weight in the range 500–1300; these are commercially available materials obtained by the reaction of maleic anhydride with a poly(isobutene) containing terminal unsaturation and (optionally) subsequent hydrogenation. Other suitable acids include fatty acids derived from animal fats and vegetable oils, for example, tall oil fatty acid, which consists predominantly of acids having $C_{16}$–$C_{18}$ aliphatic chains, and coconut oil fatty acids, which consist predominantly of acids having $C_{12}$–$C_{14}$ aliphatic chains.

The salt of the amino compound and the long-chain acid may be obtained in known manner by combining approximately stoichiometric proportions of the two materials; in some cases it may be desirable to heat the mixture gently in order to render it sufficiently fluid for complete formation of the salt to occur. The salt may be formed prior to blending it with the block or graft copolymer, or the two components of the salt and the copolymer may be blended together in a single operation.

The relative proportions, in the compositions of the invention, of the block or graft copolymer (i) and the salt of the amino compound and the long-chain acid (ii) may vary, within the broad ranges defined above, according to the particular nature of the two phases which are to be emulsified, but the following illustrations of individual constituents (i) and (ii) and of the compositions of blends thereof, are given for general guidance in Tables I and II below.

TABLE I

| Block copolymer | 'A' block Composition | Wt. % | 'B' block Composition | Wt. % |
|---|---|---|---|---|
| Q | Poly(12-hydroxy-stearic acid) | 70 | Polyethylene glycol | 30 |
| R | Poly(12-hydroxy-stearic acid) | 65 | Polyethylene gylcol | 35 |
| S | Poly(12-hydroxy-stearic acid) | 60 | Polyethylene glycol | 40 |

TABLE I-continued

| Block copolymer | 'A' block Composition | Wt. % | 'B' block Composition | Wt. % |
|---|---|---|---|---|
| T | Poly(12-hydroxy-stearic acid) | 55 | Polyethylene glycol | 45 |

TABLE II

| Blend No. | Block Co-polymer | % by wt. | Amino Compound | % by wt. | Long-chain acid | % by wt. |
|---|---|---|---|---|---|---|
| 1 | Q | 20 | TEA | 10.0 | PIBSA 1000 | 70.0 |
| 2 | " | 50 | " | 6.5 | " | 43.5 |
| 3 | " | 50 | DEA | 5.0 | " | 45.0 |
| 4 | " | 50 | BA | 3.0 | " | 47.0 |
| 5 | R | 50 | TEA | 6.0 | " | 44.0 |
| 6 | " | 50 | DMAPA | 5.0 | " | 45.0 |
| 7 | S | 50 | T | 4.0 | " | 46.0 |
| 8 | S | 50 | TEA | 6.5 | " | 43.5 |
| 9 | " | 50 | " | 5.0 | PIBSA 1300 | 45.0 |
| 10 | " | 50 | " | 9.0 | PIBSA 650 | 41.0 |
| 11 | " | 50 | DEA | 5.0 | PIBSA 1000 | 45.0 |
| 12 | " | 50 | MDEA | 6.0 | " | 44.0 |
| 13 | " | 50 | " | 10.0 | PIBSA 500 | 40.0 |
| 14 | " | 50 | BA | 3.0 | PIBSA 1000 | 47.0 |
| 15 | " | 50 | OA | 5.0 | " | 45.0 |
| 16 | " | 50 | DDA | 19.0 | TOFA | 31.0 |
| 17 | " | 50 | ODA | 9.0 | PIBSA 1000 | 41.0 |
| 18 | " | 50 | E | 12.0 | " | 38.0 |
| 19 | " | 50 | DMAE | 12.0 | TOFA | 38.0 |
| 20 | " | 50 | DMAPA | 5.0 | PIBSA 1000 | 45.0 |
| 21 | " | 50 | M | 11.0 | TOFA | 39.0 |
| 22 | " | 50 | " | 4.0 | PIBSA 1000 | 46.0 |
| 23 | " | 50 | MA | 7.0 | COFA | 43.0 |
| 24 | " | 80 | DEA | 2.0 | PIBSA 1000 | 18.0 |
| 25 | " | 80 | DMAPA | 2.0 | " | 18.0 |
| 26 | T | 50 | TEA | 6.0 | " | 44.0 |
| 27 | " | 50 | DEA | 5.0 | " | 45.0 |

Key to Abbreviations in Table II

| | | | |
|---|---|---|---|
| MA | Methylamine | TEA | Triethanolamine |
| BA | n-Butylamine | DEA | Diethanolamine |
| OA | n-Octylamine | MDEA | Methyldiethanolamine |
| DDA | Dodecylamine | DMAE | Dimethylaminoethanol |
| ODA | Octadecylamine | DMAPA | Dimethylaminopropylamine |
| E | "Ethomeen" 18/12 | | |
| M | Morpholine | | |
| T | Triethylamine | | |
| PIBSA | Poly(isobutenyl)succinic acid (the number stated indicates the molecular weight) | | |
| TOFA | Tall oil fatty acid | | |
| COFA | Coconut oil fatty acids | | |

A particularly preferred surfactant composition according to the invention is the blend 8 shown in Table II.

According to a further aspect of the present invention, there is provided an emulsion of methanol or ethanol in a liquid hydrocarbon fuel, the emulsion containing from 1% to 75% by weight of methanol or ethanol as the disperse phase and from 25% to 99% by weight of the hydrocarbon fuel as the continuous phase, and in addition, as emulsifying agent, from 1% to 100% by weight, based on the disperse phase, of a surfactant composition as hereinabove defined. From a practical point of view, particular interest centres around emulsions which contain from 5% to 60% of methanol or ethanol and from 40% to 95% of hydrocarbon fuel, since the fuel value of the emulsions falls off steadily with increasing alcohol content and the viscosity rises as the disperse phase volume increases.

Hydrocarbon fuels in which methanol or ethanol may be emulsified according to the invention include, for example, commercial grade diesel oil, '35 seconds' gas oil, No. 3 fuel oil, commercial grade '2-star' petrol and commercial grade mineral oil (having a viscosity of 60 centistokes at 40° C.).

Although the disperse phase of the emulsions may consist of essentially pure methanol or ethanol, emulsions of practical interest may be obtained according to the invention in which the methanol or ethanol contains up to 20% of its weight of water. In commercial application, water contents in the range 5-10% by weight may commonly be encountered. In general, where the water content of the methanol or ethanol is low, it is preferred to employ, as the block or graft copolymer constituent of the surfactant composition, a copolymer having a content of the component B lying towards the upper end of the preferred range previously referred to, viz. a value in the region of 40-45%; conversely, where the methanol or ethanol contains proportions of water approaching the maximum of 20%, it is preferred to use a block or graft copolymer having a lower content of component B, in the region of 30%.

The proportion of the surfactant composition employed to the total amount of the emulsion will vary, within the broad range stated above, not only according to the nature and relative proportions of the two constituents of the surfactant blend but also according to whether it is methanol or ethanol that is to be emulsified and according to the water content of the alcohol. In general, the higher the water content, the easier it becomes to emulsify the alcohol because of the greater degree of its immiscibility with the hydrocarbon. With methanol, or with ethanol containing 5% or more of water, stable emulsions are readily formed in diesel oil using a proportion of the surfactant composition in the range 1% to 20%, preferably 3% to 10% and more preferably in the region of 5%, by weight of the alcohol phase. However, with certain combinations, for example that of ethanol containing less than 5% of water with diesel oil, where the disperse phase has a significant but finite degree of miscibility with the continuous phase, it may be necessary to use an amount of the surfactant composition which approaches the actual amount of the alcohol in the mixture, if stable products are to be obtained. These products differ from the other emulsions according to the invention, which are characteristically turbid and contain disperse phase droplets of a size in the region of 0.1 microns or more, in being only slightly hazy or even completely clear, like a solution. The physical state of the alcohol constituent in these cases is not completely elucidated, but it is evident that the average size of the disperse phase droplets must be very small, perhaps of the order of a few tens or hundreds of Ångstrom units only; for convenience these products may be referred to as "microemulsions".

The optimum surfactant composition for any particular system to be emulsified can, however, readily be ascertained by simple experiment.

The emulsions according to the invention are conveniently produced by first dissolving or dispersing the selected emulsifier blend in the hydrocarbon liquid, with the aid of gentle heating where necessary. The alcohol phase is then added, initially under low speed mixing conditions and if necessary subsequently at high speed for a period of 1-2 minutes, ensuring that the temperature does not exceed a value at which significant evaporation of the alcohol phase occurs, e.g. about 40° C. The resulting emulsion is considered to be stable if no more than slight separation of either phase is detectable after 5 days' storage at ambient temperature, any separation being redispersible by gentle agitation.

There may, if desired, be present in the emulsions of the invention conventional fuel additives. Thus, for example, there may be incorporated in the alcohol phase of a diesel oil emulsion a lubricant whereby seizing of the fuel injection pump of an engine powered by the emulsion may be prevented.

The invention is illustrated but not limited by the following Examples, in which parts, ratios and percentages are by weight.

EXAMPLES

General Procedure

The block or graft copolymer constituent and the anine/acid salt, as identified in detail below, were blended together and then dissolved or dispersed in the hydrocarbon liquid, with the assistance of mild heat where necessary (not exceeding a temperature of 50° C.). The alcohol phase, as identified below, was then added to the hydrocarbon phase with low speed mixing, followed where necessary by high speed mixing for 1-2 minutes.

EXAMPLE 1

"Microemulsion" of 99% ethanol in diesel oil 20 parts of the surfactant blend 8 (see Table II) were dissolved in 80 parts of diesel oil, and to the solution were added with stirring by hand 20 parts of 99% ethanol. A stable microemulsion was formed.

EXAMPLE 2

Emulsion of 99% ethanol in mineral oil 20 parts of 99% ethanol were added to a mixture of 79 parts of mineral oil (viscosity 60 cs at 40° C.) and 1 part of blend 8. After agitation of the blend on a high-shear emulsifier, a stable emulsion was obtained.

EXAMPLE 3

Emulsions of 95% ethanol in diesel oil 1 part of surfactant blend 12 was dissolved in diesel oil (79 parts) and 95% ethanol (20 parts) was then added. The mixture was emulsified according to the general procedure outlined above. A stable emulsion resulted. Similar results were obtained when blend 12 was replaced by the same amount of blend 5, blend 9, blend 10, blend 11, blend 13, blend 19, blend 25 and blend 26 respectively.

EXAMPLE 4

Emulsions of 90% ethanol in diesel oil (a) 1 part of surfactant blend 27 was dissolved in diesel oil (79 parts) and 90% ethanol (20 parts) was then added. The mixture was emulsified according to the general procedure. A stable emulsion resulted, and similar results were obtained when blend 27 was replaced by the same amount of blend 7, blend 15 and blend 20 respectively.

(b) 3 parts of surfactant blend 8 were dissolved in diesel oil (37 parts). Into this solution were emulsified according to the general procedure 60 parts of 90% ethanol containing 4% of "Alcolube" L45 (Registered Trade Mark) (a lubricant). A stable emulsion resulted.

EXAMPLE 5

Emulsions of 80% ethanol in diesel oil 1 part of surfactant blend 3 was dissolved in diesel oil (79 parts) and 80% ethanol (20 parts) was then added. The mixture was emulsified according to the general procedure. A stable emulsion was obtained, and this result was repeated when the blend 3 was replaced by a similar amount of blend 6.

EXAMPLE 6

Microemulsion of 100% methanol in diesel oil 20 parts of surfactant blend 8 were dissolved in 80 parts of diesel oil. 20 parts of 100% methanol were added with hand stirring, forming a stable microemulsion.

EXAMPLE 7

Emulsions of 100% methanol in diesel oil (a) 1 part of surfactant blend 19 was dissolved in diesel oil (79 parts) and 100% methanol (20 parts) was added. Emulsification according to the general procedure gave a stable emulsion, and the same result was obtained when blend 19 was replaced by the same amount of blend 8, blend 4, blend 17, blend 18, blend 21, blend 22, blend 24 and blend 27 respectively.

(b) 50 parts of 100% methanol containing 5% of "Alcolube" L45 were emulsified according to the general procedure in 50 parts of diesel oil containing 3 parts of blend 8. A stable emulsion was obtained.

EXAMPLE 8

Emulsions of 90% methanol in diesel oil 1 part of surfactant blend 16 gas dissolved in diesel oil (79 parts) and 90% methanol (20 parts) was added. Following the general procedure, a stable emulsion was obtained and a similar result was achieved when blend 16 was replaced by the same amount of blend 1 and blend 4 respectively.

EXAMPLE 9

Emulsions of 80% methanol in diesel oil (a) 1 part of surfactant blend 2 was dissolved in diesel oil (79 parts) and 80% methanol (20 parts) was emulsified into the solution according to the general procedure. A stable emulsion was obtained.

(b) 1 part of surfactant blend 23 was dissolved in diesel oil (79 parts) and 80% methanol(20 parts) added. After following the general emulsification procedure, a stable emulsion was obtained.

What we claim is:

1. A surfactant composition suitable for the emulsification of methanol or ethanol in a hydrocarbon liquid, the composition being a blend of:
(i) from 10% to 90% by weight of a block or graft copolymer having the general formula (A—COO)$_m$—B, wherein m is an integer at least 2, wherein each polymeric component A has a molecular weight of at least 500 and is the residue of an oil-soluble complex monocarboxylic acid having the general structural formula

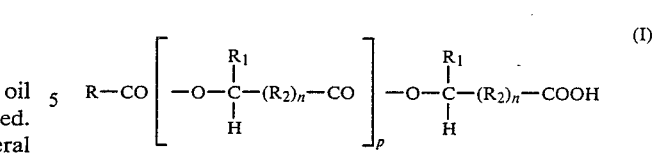

in which

R is hydrogen or a monovalent hydrocarbon or substituted hydrocarbon group;

$R_1$ is hydrogen or a monovalent $C_1$ to $C_{24}$ hydrocarbon group;

$R_2$ is a divalent $C_1$ to $C_{24}$ hydrocarbon group;

n is zero or 1;

p is an integer from zero up to 200;

and wherein each polymeric component B has a molecular weight of at least 500 and, in the case where m is 2, is the divalent residue of a water-soluble polyalkylene glycol having the general formula

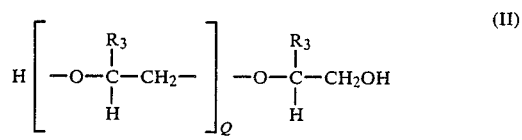

in which $R_3$ is hydrogen or a $C_1$ to $C_3$ alkyl group;

q is an integer from 10 up to 500;

or in the case where m is greater than 2, is the residue of valency m of a water-soluble polyether polyol having the general formula

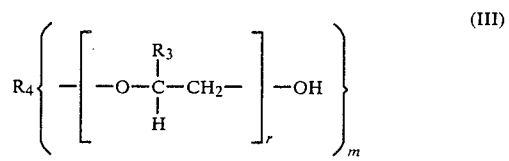

in which $R_3$ and m have their previous significance;

r is zero or an integer from 1 to 500, provided that the total number of

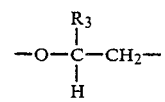

units in the molecule is at least 10;

$R_4$ is the residue of an organic compound containing in the molecule m hydrogen atoms reactive with an alkylene oxide;

with (ii) from 90% to 10% by weight of the salt of an aliphatic amino compound with a long-chain aliphatic carboxylic acid.

2. A composition as claimed in claim 1, wherein the block or graft copolymer is one according to formula (I) where m has a value of 2 and the water-soluble polyalkylene glycol from which the polymeric component B is derived is a polyethylene glycol of molecular weight in the range 1000–4000.

3. A composition as claimed in claim 1, wherein the copolymer contains from 20% to 50% by weight of the polyethylene glycol-derived polymeric component B.

4. A composition as claimed in claim 3, wherein the copolymer contains from 30% to 45% by weight of the polyethylene glycol-derived polymeric component B.

5. A composition as claimed in claim 1, wherein the polymeric component A of the block or graft copolymer is the residue of poly(12-hydroxystearic acid).

6. A composition as claimed in claim 1, wherein the aliphatic amino compound is an aminoalcohol.

7. A composition as claimed in claim 6, wherein the aminoalcohol is triethanolamine.

8. A composition as claimed in claim 1, wherein the long-chain aliphatic carboxylic acid is a poly(isobutenyl)succinic acid of molecular weight in the range 500–1300.

9. An emulsion of methanol or ethanol in a liquid hydrocarbon fuel, the emulsion containing from 1% to 75% by weight of methanol or ethanol as the disperse phase and from 25% to 99% by weight of the hydrocarbon fuel as the continuous phase, and in addition, as emulsifying agent, from 1% to 100% by weight, based on the disperse phase, of a surfactant composition as claimed in claim 1.

10. An emulsion as claimed in claim 9, containing from 5% to 60% of methanol or ethanol and from 40% to 95% of hydrocarbon fuel.

11. An emulsion as claimed in claim 9, wherein the hydrocarbon fuel is a commercial grade diesel oil.

12. An emulsion as claimed in claim 9, wherein the methanol or ethanol contains up to 20% of its weight of water.

* * * * *